United States Patent
Ulrey et al.

(10) Patent No.: US 10,163,279 B2
(45) Date of Patent: Dec. 25, 2018

(54) METHOD TO ADJUST FUEL ECONOMY READINGS FOR STORED ENERGY

(71) Applicant: Ford Global Technologies, LLC, Dearborn, MI (US)

(72) Inventors: Joseph Norman Ulrey, Dearborn, MI (US); Ross Dykstra Pursifull, Dearborn, MI (US); William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 15/159,648

(22) Filed: May 19, 2016

(65) Prior Publication Data

US 2016/0267727 A1    Sep. 15, 2016

Related U.S. Application Data

(62) Division of application No. 14/257,890, filed on Apr. 21, 2014, now Pat. No. 9,367,972.

(51) Int. Cl.
    *G06F 19/00*    (2018.01)
    *G07C 5/08*    (2006.01)
    (Continued)

(52) U.S. Cl.
    CPC ............ G07C 5/0816 (2013.01); B60K 37/02 (2013.01); B60W 40/00 (2013.01); G01F 9/023 (2013.01);
    (Continued)

(58) Field of Classification Search
    CPC ............ G01C 21/3469; G01C 21/3484; G07C 5/0816; G01F 9/00
    See application file for complete search history.

(56) References Cited

U.S. PATENT DOCUMENTS 4,129,034 A * 12/1978 Niles ........................ G01F 9/001
                                                          73/114.14
4,171,613 A * 10/1979 Schmidt-Roedenbeck ..................
                                                          F02C 9/28
                                                          60/39.281

(Continued)

FOREIGN PATENT DOCUMENTS

CN     104089666 A    10/2014
GB     2150295 A      6/1985
WO     8301686 A1     5/1983

OTHER PUBLICATIONS

State Intellectual Property Office of the People's Republic of China, Office Action and Search Report Issued in Application No. 201510190843.7, dated Jun. 29, 2018, 11 pages. (Submitted with Partial Translation).

*Primary Examiner* — Khoi H Tran
*Assistant Examiner* — Jorge O Peche
(74) *Attorney, Agent, or Firm* — Julia Voutyras; McCoy Russell LLP

(57) ABSTRACT

Methods and systems are provided for compensating an instantaneous fuel economy reading for stored energy. One method comprises, when a vehicle undergoes a sufficient change in one or more of square of vehicle speed and vehicle altitude, estimating a conversion factor for fuel due to stored vehicle energy and adjusting the instantaneous fuel economy reading by the estimated conversion factor. The adjusted instantaneous fuel economy reading may be displayed to an operator of the vehicle.

10 Claims, 10 Drawing Sheets

(51) Int. Cl.
*B60W 40/00* (2006.01)
*B60K 37/02* (2006.01)
*G01F 9/02* (2006.01)

(52) U.S. Cl.
CPC .. *B60K 2350/1092* (2013.01); *B60W 2520/10* (2013.01); *B60W 2550/145* (2013.01); *Y02T 10/84* (2013.01)

(56) References Cited

U.S. PATENT DOCUMENTS

| | | | | |
|---|---|---|---|---|
| 4,356,726 A * | 11/1982 | Yoshino | G01C 9/00 | 33/366.14 |
| 4,369,026 A * | 1/1983 | Morgan | F23N 1/022 | 431/12 |
| 4,408,585 A * | 10/1983 | Stuckas | F02D 41/1406 | 123/676 |
| 4,425,886 A * | 1/1984 | Kuroiwa | F02D 41/149 | 123/339.24 |
| 5,476,081 A * | 12/1995 | Okawa | F02D 41/0045 | 123/478 |
| 5,481,462 A * | 1/1996 | Nagai | F02D 41/0072 | 123/478 |
| 5,578,748 A * | 11/1996 | Brehob | G01F 9/023 | 701/123 |
| 5,913,917 A * | 6/1999 | Murphy | B60R 16/0232 | 701/123 |
| 5,918,581 A * | 7/1999 | Uto | F02M 25/08 | 123/198 D |
| 6,167,343 A * | 12/2000 | Bauerle | F02D 11/105 | 123/350 |
| 6,289,880 B1 * | 9/2001 | Yamaguchi | F02M 25/0809 | 123/520 |
| 7,047,125 B1 * | 5/2006 | He | F02D 41/2432 | 701/101 |
| 2001/0020900 A1 * | 9/2001 | Froeschl | B60R 21/013 | 340/671 |
| 2003/0209232 A1 * | 11/2003 | Hou | F02D 41/3836 | 123/459 |
| 2005/0027423 A1 * | 2/2005 | Minami | G01F 9/023 | 701/51 |
| 2007/0175459 A1 * | 8/2007 | Williams | F02D 19/0605 | 123/575 |
| 2008/0041645 A1 * | 2/2008 | Bauerle | B60W 10/08 | 180/65.28 |
| 2008/0114545 A1 * | 5/2008 | Takaoka | G01C 21/265 | 701/526 |
| 2008/0173280 A1 * | 7/2008 | Hou | F02D 41/3836 | 123/457 |
| 2008/0257429 A1 * | 10/2008 | Nanaji | B67D 7/16 | 137/557 |
| 2010/0036583 A1 * | 2/2010 | Vestrini | F02D 19/0631 | 701/103 |
| 2010/0274444 A1 * | 10/2010 | Williamson | B64D 39/00 | 701/29.8 |
| 2010/0318279 A1 * | 12/2010 | Meyer | F02D 35/021 | 701/103 |
| 2011/0077898 A1 * | 3/2011 | Loomis | G01C 5/00 | 702/141 |
| 2011/0172871 A1 * | 7/2011 | Hall | B60W 50/14 | 701/31.4 |
| 2011/0276260 A1 * | 11/2011 | Sim | B60R 16/0236 | 701/123 |
| 2012/0022780 A1 * | 1/2012 | Kulik | G01C 21/28 | 701/498 |
| 2012/0215417 A1 * | 8/2012 | Boyer | F01D 17/162 | 701/100 |
| 2012/0226424 A1 * | 9/2012 | Adams | F01N 3/20 | 701/93 |
| 2013/0046466 A1 * | 2/2013 | Yucel | G01C 21/3469 | 701/538 |
| 2013/0046526 A1 * | 2/2013 | Yucel | G01C 21/3469 | 703/8 |
| 2014/0000276 A1 * | 1/2014 | Royer | F02C 7/228 | 60/776 |
| 2014/0156150 A1 * | 6/2014 | Kasaba | B60Q 1/10 | 701/49 |

* cited by examiner

METHOD TO ADJUST FUEL ECONOMY READINGS FOR STORED ENERGY

CROSS REFERENCE TO RELATED APPLICATIONS

The present application is a divisional of U.S. patent application Ser. No. 14/257,890, entitled "METHOD TO ADJUST FUEL ECONOMY READINGS FOR STORED ENERGY," filed on Apr. 21, 2014, the entire contents of which are hereby incorporated by reference for all purposes.

FIELD

The present description relates to compensating an instantaneous fuel economy reading for stored vehicle energy.

BACKGROUND AND SUMMARY

Fuel economy of a vehicle may be displayed to an operator of the vehicle as a long term average and/or an instantaneous fuel economy reading. The instantaneous fuel economy reading provides real time fuel consumption data allowing the operator to adjust her/his driving style for improved fuel economy. However, the displayed instantaneous fuel economy readings may have large variations due to stored kinetic and potential energy, e.g., a zero at acceleration and an infinite value at deceleration, making such readings useless to the operator unless heavily filtered.

An example approach of adjusting mileage display for stored energy is shown by Sim in US 2011/0276260. Herein, an effective amount of consumed fuel is determined by measuring an actual amount of fuel consumed, and subtracting a fuel equivalent for each of stored energy and consumed energy from the actual amount of consumed fuel. A mileage based on the amount of effective fuel amount is then displayed to an operator of the vehicle.

However the inventors herein have identified potential issues with the above approach. As an example, the above approach utilizes extensive on-board computations and measurements that are stored in the memory of the vehicle prior to delivery from a factory. For example, the fuel equivalent for stored energy incorporates a conversion coefficient which is related to a dynamic energy storage efficiency and an electric energy storage energy efficiency. These efficiencies are measured on bench with energy being supplied by a generator separate from the vehicle, and are stored in the vehicle memory as a priori information. Further, an altitude change is measured via an inclinometer installed in the vehicle body which may be prone to an offset error based on the loading of the vehicle. The approach by Sim also involves multiple complicated and intensive computations including a vehicle mass calculation to determine stored kinetic and potential energy, a rotational angular velocity calculation to determine rotational speed, and a battery power calculation to determine stored electrical energy.

The inventors herein have identified an approach to at least partly address the above issues. In one example approach, a method for an engine in a vehicle is provided that utilizes a conversion factor for stored energy. The method comprises, when the vehicle undergoes a sufficient change in one or more of square of vehicle speed and vehicle altitude, estimating a conversion factor for fuel due to stored vehicle energy and adjusting a fuel economy reading by the estimated conversion factor. In this way, a simplified approach without excessive inputs may be used to compensate a fuel economy reading for stored energy.

For example, when a vehicle is traveling under steady state driving conditions, e.g. during cruising conditions, a fuel economy reading in miles per gallon (MPG) may be calculated. Steady state driving conditions may include conditions when changes in each of a square of vehicle speed and a vehicle altitude are below a respective threshold. During conditions when the vehicle experiences a sufficient increase in one or both of a square of vehicle speed and vehicle altitude, a conversion factor may be determined based on the fuel economy reading calculated at steady state driving conditions. Thus, the conversion factor may be determined when energy is being added to the vehicle system as one or both of kinetic energy and potential energy. The conversion factor may be based on an estimated fuel flow due to stored vehicle energy which is calculated by subtracting a fuel flow rate measured during steady state driving conditions from an existing fuel flow rate. As such, a difference between excess fuel flow during conditions when energy is being added to the system and steady state fuel flow may be used to determine the conversion factor for vehicle stored energy. The conversion factor may be directly proportional to fuel flow due to stored vehicle energy and inversely proportional to each of a change in square of vehicle speed and a change in vehicle altitude. The change in vehicle altitude may be measured by an inclinometer and corrected for offset error due to vehicle loading issues. The conversion factor may then be used to compensate a measured fuel economy reading for changes in stored energy.

In this way, a conversion factor can be learned based on fuel flow, a change in vehicle altitude, and a change in square of vehicle speed, every time specific conditions are met and may be stored in a controller's memory. Likewise, fuel economy readings during steady state driving conditions may be computed when certain conditions are met and stored in the controller's memory. The controller may be configured to use a rolling average of each of these readings when performing further calculations. The correction for fuel economy readings may be steadily improved by recurrently learning and adapting the conversion factor as the vehicle is being driven. Thus, laborious on-bench calculations of efficiency, a priori knowledge of fuel energy, and on board calculations of vehicle mass may be reduced by learning the conversion factor as described. Overall, a simpler methodology for compensating instantaneous fuel economy for stored energy is provided that may be used across vehicles which use different fuels, as engine efficiencies fluctuate, and as changes in vehicle mass are encountered.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
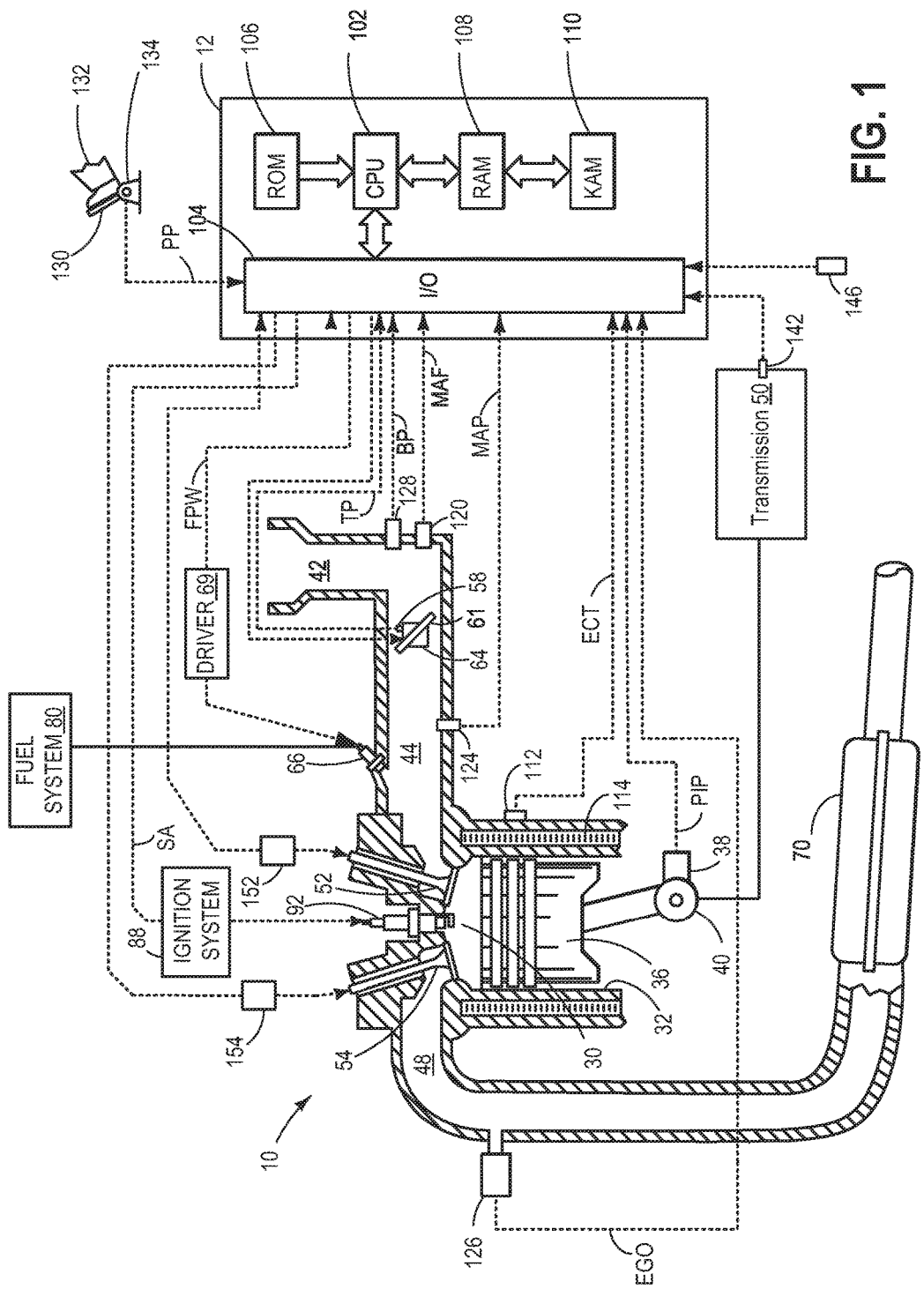
FIG. 1 portrays a schematic diagram of an engine.
Figure 5:
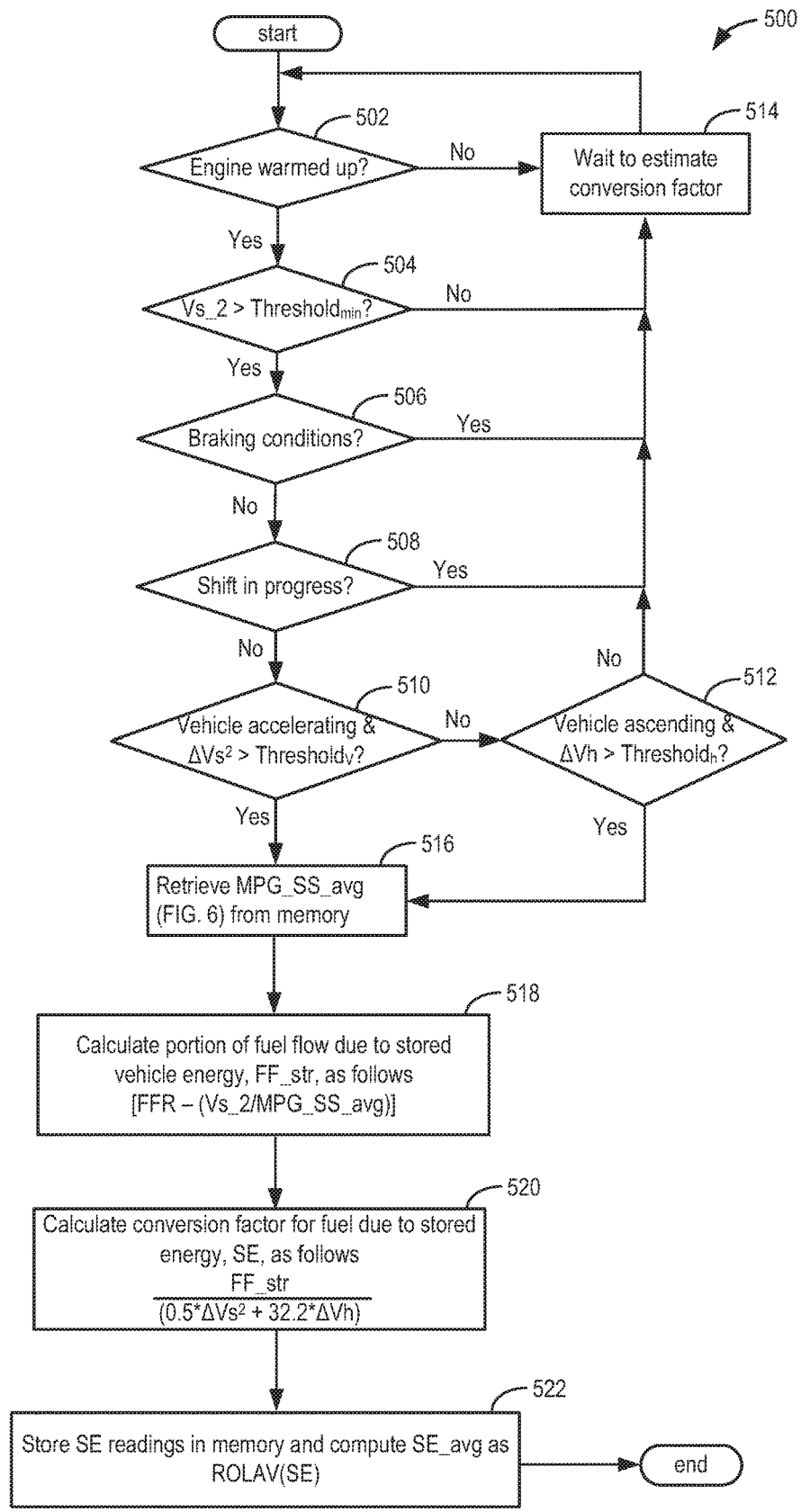
FIG. 5 presents an example flowchart for calculating a conversion factor for stored vehicle energy based on entry conditions being met.
Figure 6:
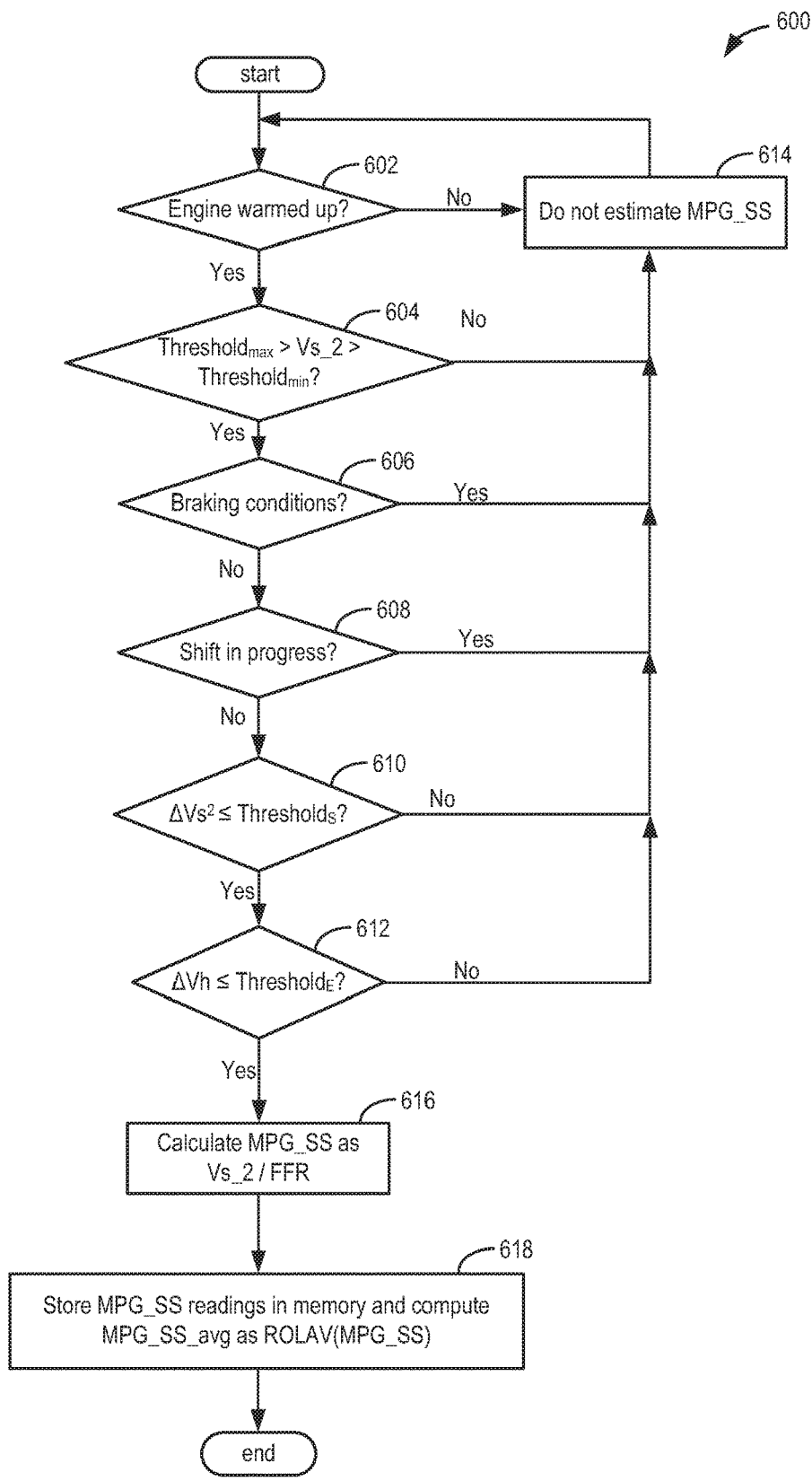
FIG. 6 illustrates an example flowchart for determining a steady state fuel economy reading, according to the present disclosure.
Figure 7:
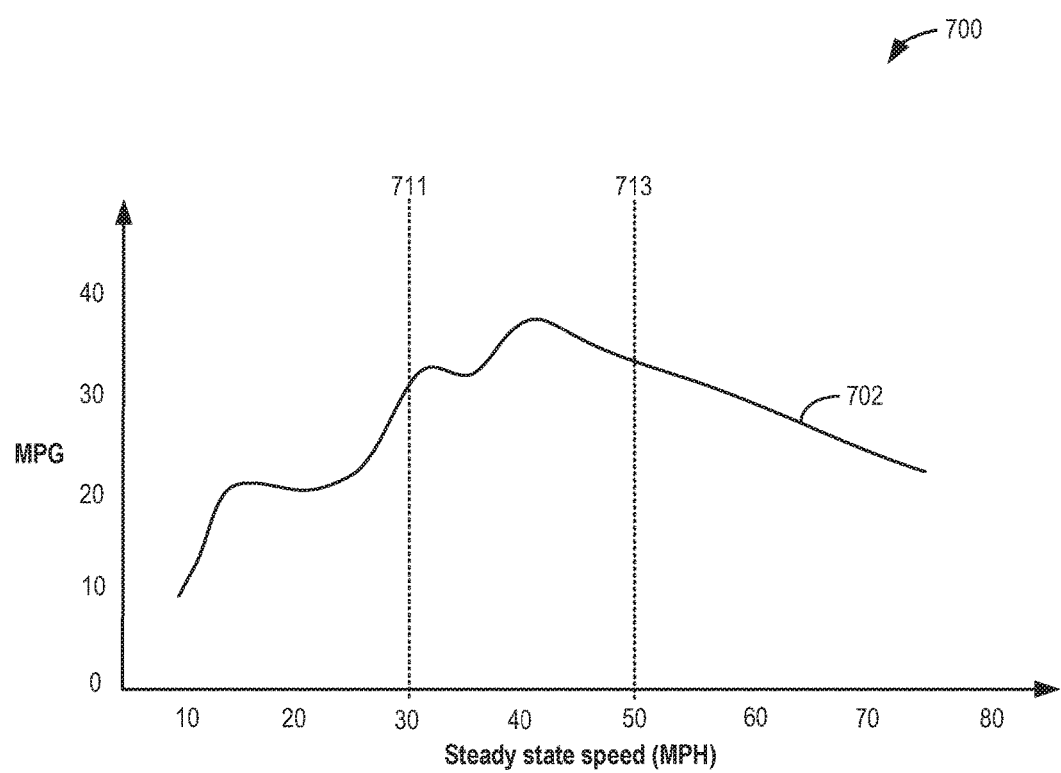
FIG. 7 is an example relationship between fuel economy or mileage and steady state vehicle speed.
Figure 8:
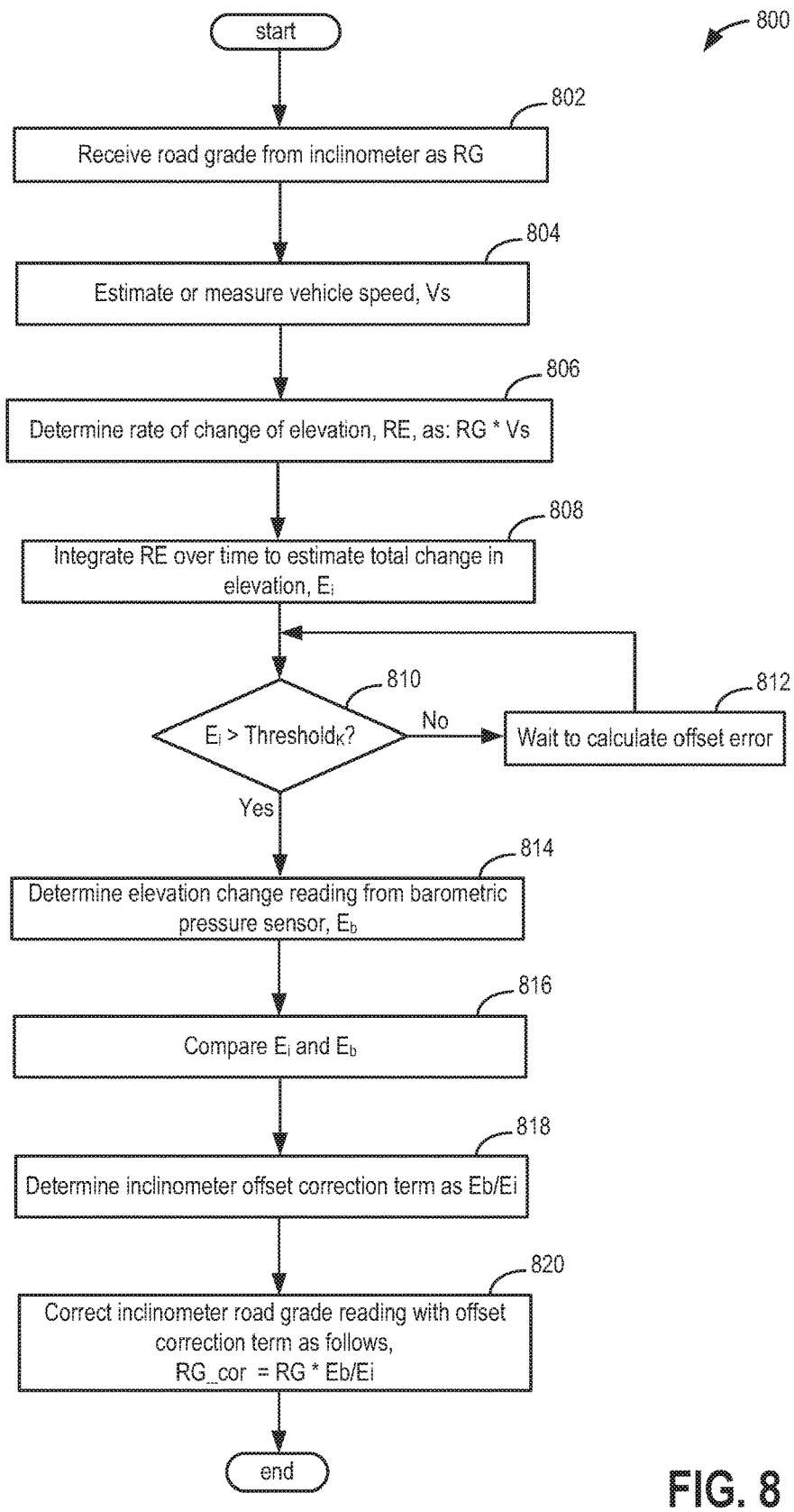
FIG. 8 illustrates an example flowchart for a routine that calculates an offset error for readings from an inclinometer.

The following description relates to systems and methods for displaying a fuel economy reading of an engine, such as the engine system of FIG. 1, the fuel economy reading being compensated for stored vehicle energy. The fuel economy reading may be displayed to an operator of a vehicle on a dashboard, such as the example dashboard of FIG. 2. A controller of the vehicle may display the fuel economy reading at periodic intervals (FIG. 3) after compensating the readings for stored vehicle energy (FIG. 4). Stored vehicle energy may include kinetic energy due to changes in vehicle speed and potential energy due to changes in vehicle altitude. Vehicle altitude changes may be measured using an inclinometer's readings which may be corrected for offset error (FIG. 8). The compensation for stored vehicle energy may be performed by using a conversion factor calculated during driving conditions which add to stored energy (FIG. 5). Further, the conversion factor may be based on a steady state fuel economy reading determined during steady state driving conditions (FIG. 6). Fuel economy readings may have smaller variation within a certain range of steady state vehicle speeds, as shown in FIG. 7. An example of improvements in instantaneous fuel economy readings is shown in the example operation of FIG. 9.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel (not shown) of a vehicle via an intermediate transmission system 50. Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Fuel injector 66 is shown coupled directly to combustion chamber 30 for injecting fuel directly therein in proportion to the pulse width of signal FPW received from controller 12 via electronic driver 69. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 may include a throttle 64 having a throttle plate 61. In this particular example, the position of throttle plate 61 may be varied by controller 12 via a signal provided to an electric motor or actuator included with throttle 64, a configuration that is commonly referred to as electronic throttle control (ETC). In this manner, throttle 64 may be operated to vary the intake air provided to combustion chamber 30 among other engine cylinders. The position of throttle plate 61 may be provided to controller 12 by throttle position signal TP. Intake passage 42 may include a mass airflow sensor 120, a barometric pressure sensor 128, and a manifold air pressure sensor 124 for providing respective signals MAF, BP, and MAP respectively, to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust manifold 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium (or non-transitory memory) for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass airflow (MAF) from mass airflow sensor 120; engine coolant temperature (ECT) from temperature sensor 112 coupled to cooling sleeve 114; vehicle speed from vehicle speed sensor 142; grade readings from an inclinometer 146; a profile ignition pickup signal (PIP) from Hall effect sensor 38 (or other type) coupled to crankshaft 40; and throttle position (TP) from a throttle position sensor 58. Engine speed signal, RPM, may be generated by controller 12 from signal PIP. Manifold pressure signal MAP from a manifold pressure sensor 124 may be used to provide an indication of vacuum, or pressure, in the intake manifold. A barometric pressure sensor 128 may provide barometric pressure readings which can also be used to determine altitude. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, Hall effect sensor 38, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below, such as those at FIGS. 3, 4, 5, 6, and 8, as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
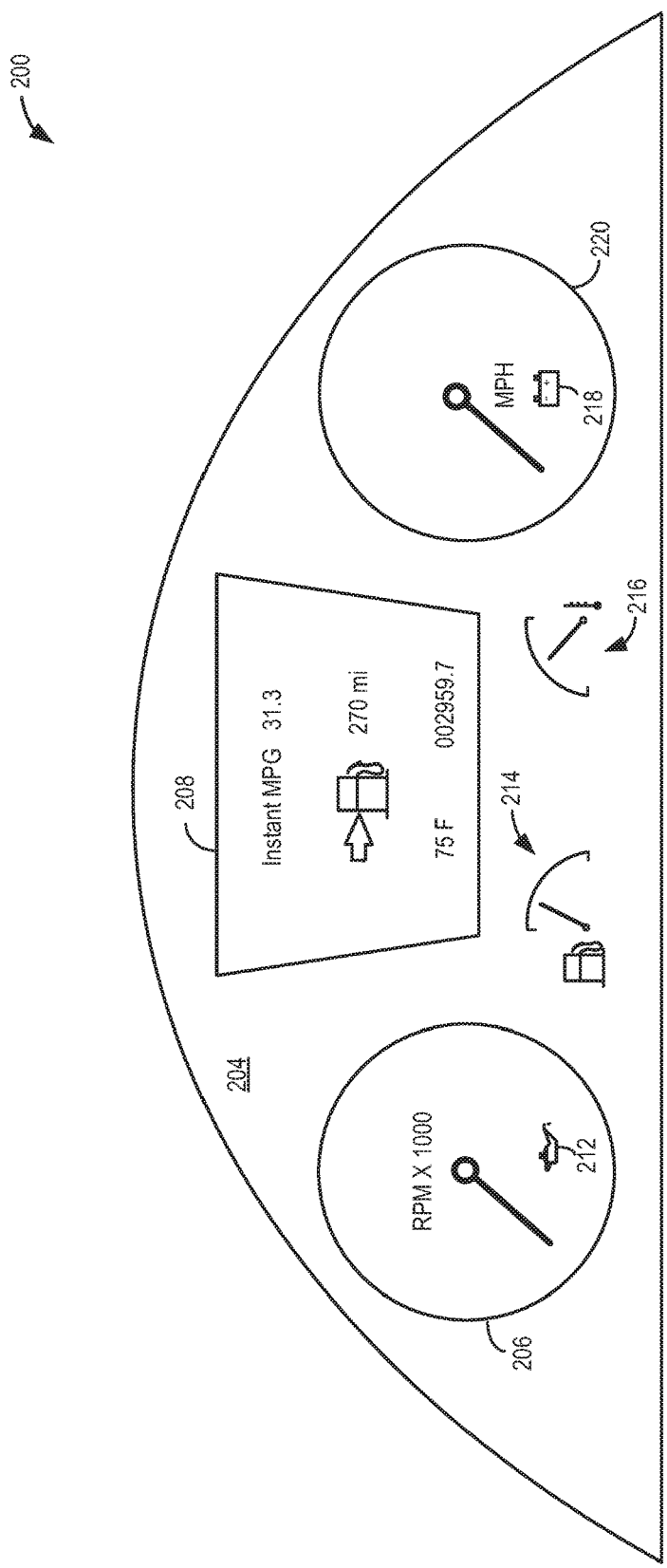
FIG. 2 depicts a schematic illustration of a vehicle dashboard.

Turning now to FIG. 2, it depicts a schematic of a dashboard display 200 as viewed by an operator of a vehicle. The dashboard includes an instrument cluster 204 situated behind a steering wheel (not shown). Instrument cluster 204 includes various gauges such as a fuel gauge 214, tachometer 206, speedometer 220, and engine temperature gauge 216 as well as indicators and warning lights. In addition to these, an electronic display 208 shows readings for instantaneous fuel economy or mileage in miles per gallon (MPG), an approximate distance that the vehicle can travel based on existing fuel, outside temperature and includes an odometer display. As such, the electronic display 208 may include other readings and FIG. 2 is a non-limiting example.

Example routines that may be performed by controller 12 to determine and display a fuel economy reading compensated for stored vehicle energy will now be described in reference to FIGS. 3, 4, 5, 6, and 8. As elaborated herein, the controller may estimate a steady state fuel economy when the vehicle is traveling at steady state conditions. Steady state fuel economy readings may be estimated, and stored, multiple times during vehicle travel when specific conditions are met. During conditions which include positive changes in one or both of square of vehicle speed and vehicle altitude, a conversion factor for fuel due to stored energy may be estimated by using the previously measured steady state fuel economy. Conversion factor readings may be estimated and stored in memory every time the vehicle experiences sufficient increase in square of vehicle speed and/or vehicle altitude. The conversion factor may be used to first correct an observed fuel flow rate which may then be used for calculating a fuel economy compensated for stored energy. The described method offers a simple yet reliable way to compensate for stored potential and kinetic energies without using complex calculations or measurements of vehicle mass, fuel energy, engine efficiency and the like, which can vary across different vehicles.

Figure 3:
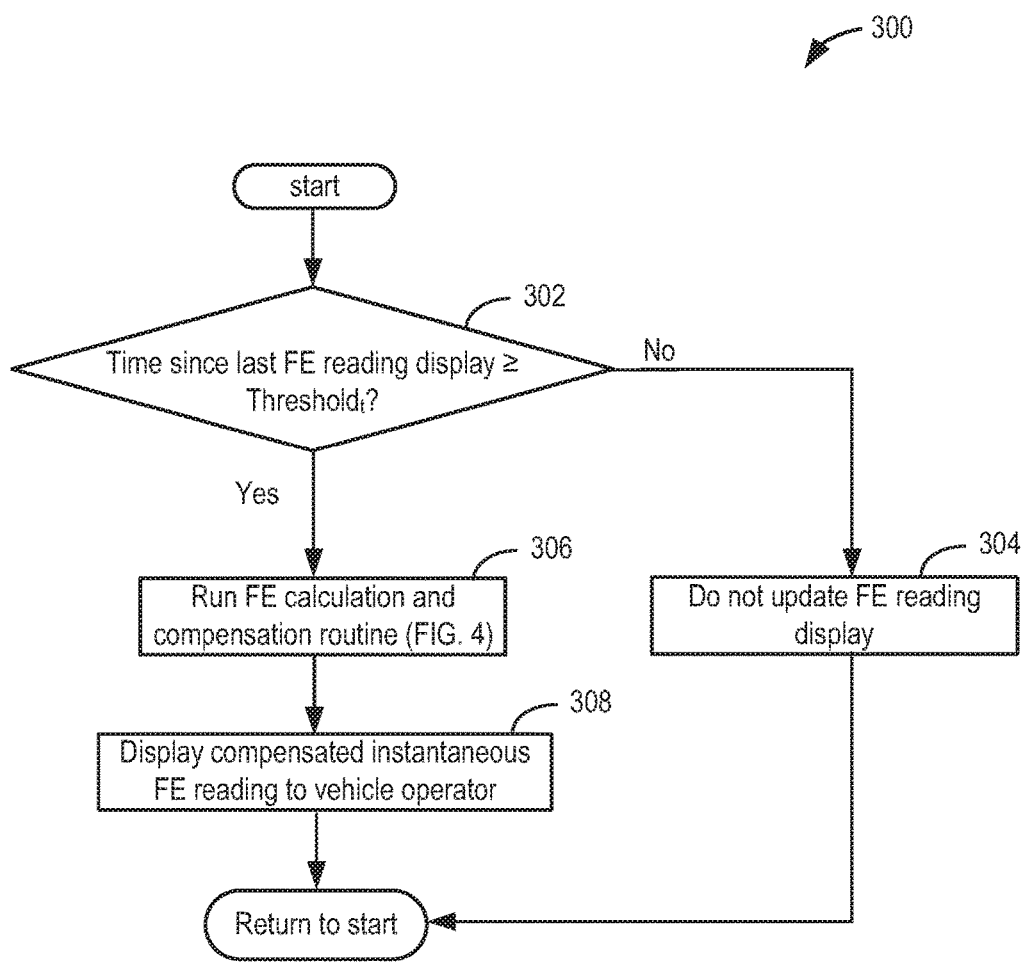
FIG. 3 is an example flowchart for a routine that displays fuel economy readings at periodic intervals.

Turning now to FIG. 3, it depicts routine 300 which estimates if a specific interval has elapsed to calculate and display an updated instantaneous fuel economy (FE) reading to an operator of a vehicle.

At 302, it may be assessed if the time since the last display of a FE reading is greater than or equal to a predetermined $Threshold_t$. As an example, $Threshold_t$ may be one second, one half of a second, five seconds or any interval preset into a controller of the vehicle to provide instantaneous or real time output. If the time since the last FE reading display is not greater than or equal to $Threshold_t$, at 304, routine 300 may not update the previous FE reading and may end.

On the other hand, if it is determined that the time since the last FE reading display is equal to or more than $Threshold_t$, at 306, a FE calculation and compensation routine may be carried out, as will be described below with reference to FIGS. 4A and 4B. At 308, the compensated instantaneous FE reading may be displayed to the operator. Therefore, routine 300 displays compensated instantaneous fuel economy readings at periodic intervals to the operator of the vehicle.

Figure 4A:
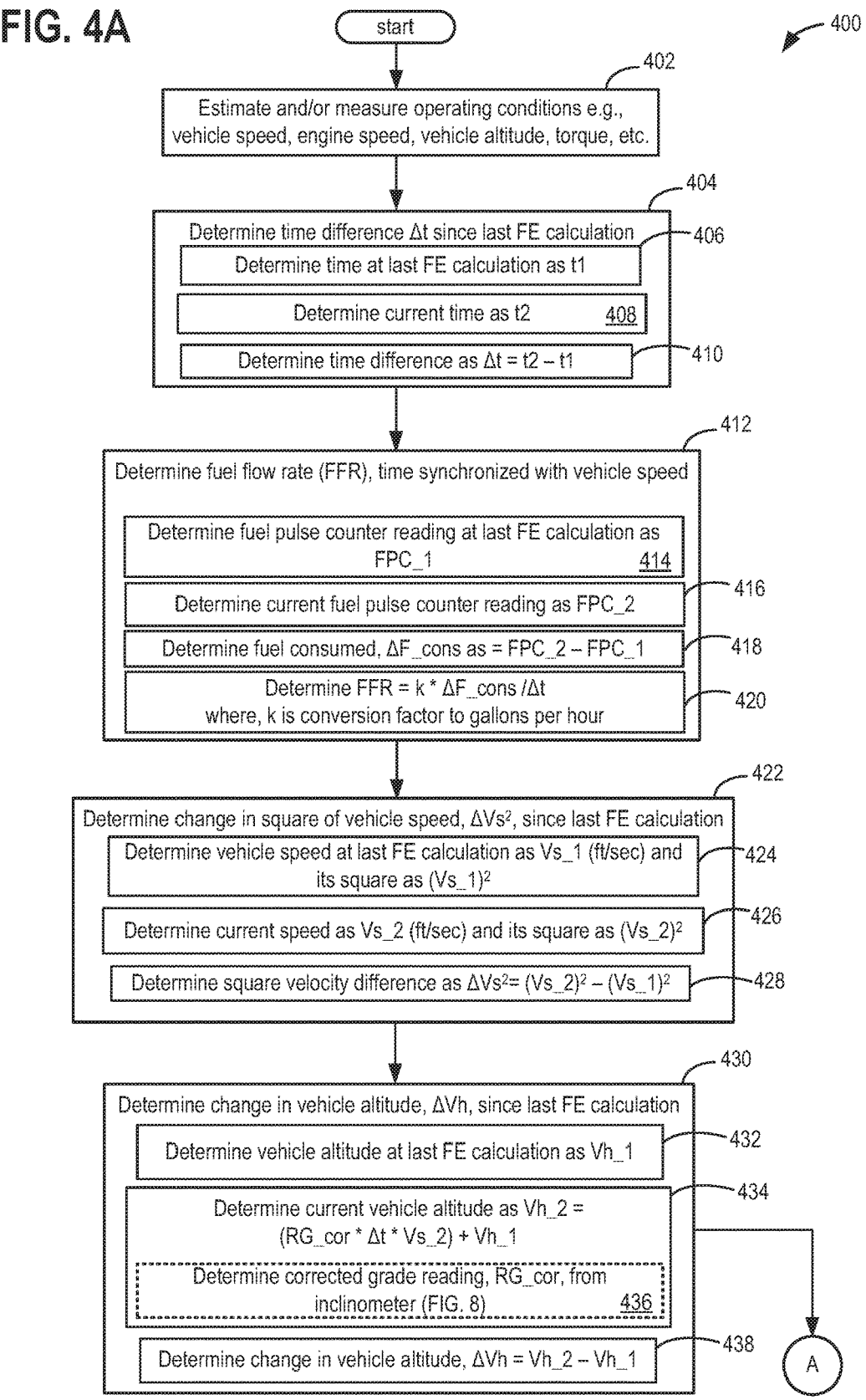
FIGS. 4A and 4B depict an example routine to calculate a compensated fuel economy reading, according to the present disclosure.
Figure 4B:
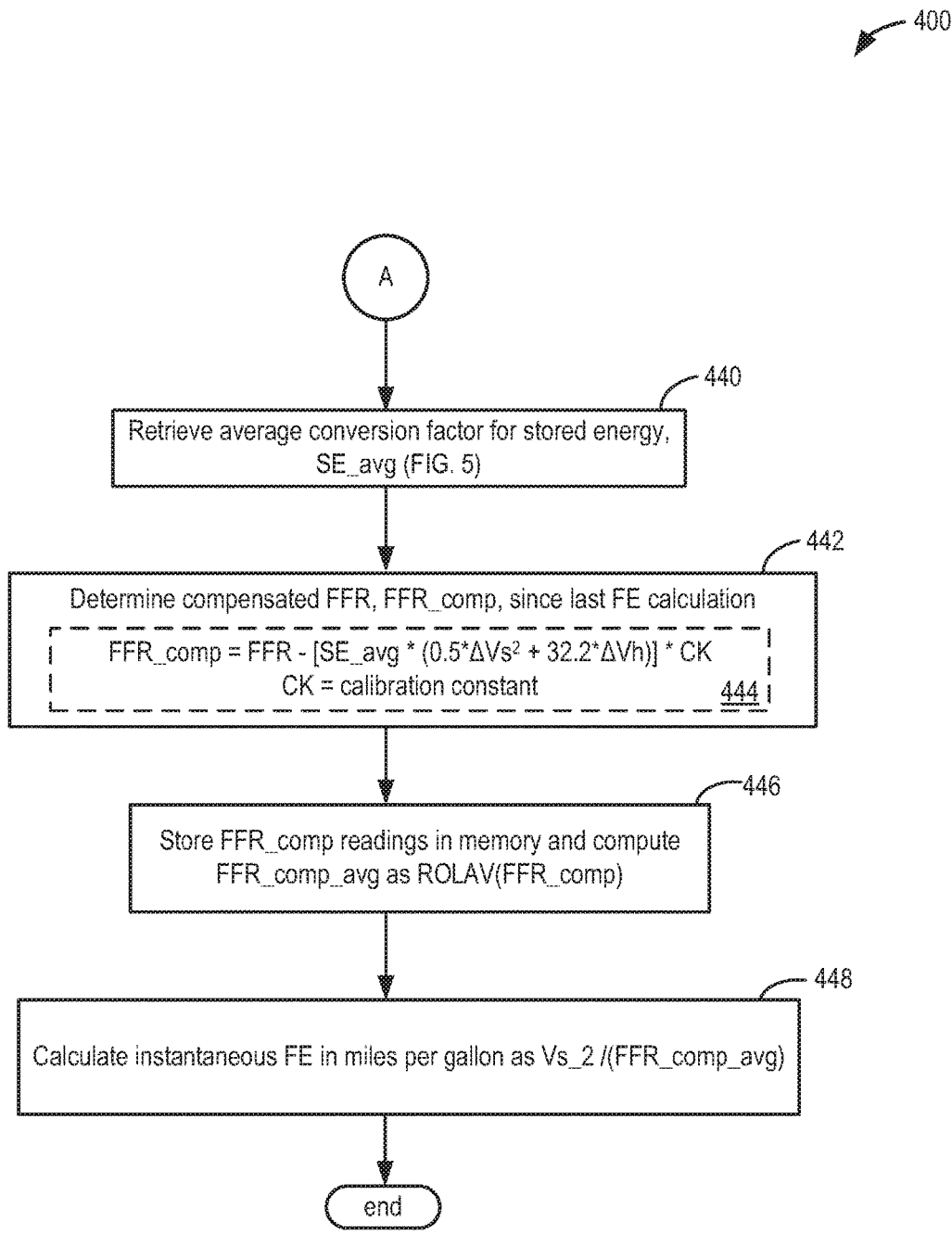

Continuing now to FIGS. 4A and 4B, they show routine 400 for calculating a FE reading that has been compensated for stored vehicle energy. Specifically, an existing fuel flow rate is calculated and compensated for stored energy, which in turn is used to determine an adjusted FE reading in miles per gallon (MPG).

At 402, engine and vehicle operating conditions may be estimated and/or measured. Engine operating conditions may include engine load, engine temperature, engine speed, torque output, etc. while vehicle operating conditions may comprise vehicle speed, vehicle altitude, etc. At 404, a time interval L may be estimated since the previous instantaneous FE reading calculation. At 406, time at the last instantaneous FE reading calculation may be set as t1, current time may be measured as t2, at 408, and the time difference between t2 and t1 may be calculated at 410 as L.

At 412, routine 400 may determine a fuel flow rate (FFR). The FFR may be time synchronized with the measurement of vehicle speed. Typically, an estimate of fuel to be injected is determined ahead of time such that the calculation of fuel flow may be a few events ahead of torque transfer to the drive wheels of the vehicle. Therefore, the measurements of fuel flow and vehicle speed may be time synchronized such that they correspond to the same time period for this calculation.

At 414, the fuel pulse counter at the previous FE calculation may be retrieved as FPC_1 while at 416, the current fuel pulse counter may be determined as FPC_2. At 418, the total fuel flow, ΔF_cons, may be estimated as being the difference between FPC_2 and FPC_1. The FFR may then be calculated, at 420, as follows:

$$FFR = k * \Delta F\_cons / \Delta t$$

where, k is a conversion factor for mass of fuel per pulse and time. Therefore, k may assist in converting mass fuel flow into gallons and time into hours.

Next, at 422, a change in the square of vehicle speed may be determined. Stored energy in the form of kinetic energy is directly proportional to the square of vehicle speed. Therefore, a change in kinetic energy is directly proportional to the change in square of vehicle speed over a period of time. At 424, the vehicle speed at the last FE calculation may be retrieved from the memory of the vehicle controller as VS_1, and its square may be determined as $(VS\_1)^2$. At 426, the current vehicle speed may be measured as VS_2 and its square may be determined as $(VS\_2)^2$. Vehicle speed may be measured in a variety of ways. In one example, a vehicle speed sensor coupled to the engine transmission may send signals to the vehicle controller. In another example, an average of individual wheel speeds may be used. The measurement may be in miles per hour and routine 400 may convert the vehicle speed measurement into feet per second. The controller may store these readings, e.g. Vs_2 and $(VS\_2)^2$ for future calculations. At 428, a difference in square velocities, $\Delta Vs^2$, may be determined as $(VS\_2)^2 - (VS\_1)^2$.

In one example, if the vehicle is decelerating as it slows down, the change in square of velocities may be negative. In another example, if the vehicle is accelerating and gaining speed, $\Delta Vs^2$ may be positive.

At 430, a change in vehicle altitude in the unit of feet may be estimated. The change in vehicle altitude may be positive (if ascending) or negative (if descending). Instantaneous fuel economy readings may be affected by stored potential energy which is directly proportional to vehicle altitude. For example, uncompensated fuel economy readings may undergo a change of about 40% when ascending or descending minor grades. By adjusting for changes in potential energy as the vehicle ascends or descends inclines, fuel economy readings may be more accurate. At 432, vehicle altitude at the last FE calculation may be retrieved as Vh_1, and current vehicle altitude, Vh_2, may be calculated at 434 as follows:

$$(RG\_cor * \Delta t * Vs\_2) + Vh\_1$$

where, RG_cor is a grade reading from an inclinometer that is corrected for offset error due to vehicle loading. As shown above, vehicle altitude may be determined by multiplying the corrected grade reading with distance traveled and adding vehicle altitude determined at the last FE calculation. An incline signal or grade reading from the inclinometer may be corrected for offset error by comparing elevation readings from the inclinometer, based on incline and vehicle speed, with those from a barometric pressure sensor, as will be described now in reference to FIG. 8.

FIG. 8 illustrates a routine 800 for determining a correction for readings from an inclinometer. Readings from an inclinometer may have higher resolution but they may be subject to offset errors. For example, when the inclinometer is mounted on the vehicle body, loading of the vehicle can result in an offset error, e.g. a constant 3% grade error may be present if the trunk of a car is heavily loaded. A barometric pressure sensor can provide readings for vehicle altitude without offset error but these readings may not have adequate resolution. For example, while each meter of altitude may result in a change in pressure of 0.01 kPa, the barometric pressure sensor can record pressure changes more accurately only over an altitude change of 2 to 5 meters. Thus, the barometric pressure sensor may have the requisite accuracy without being prone to offset errors but may suffer from lack of resolution. Routine 800 provides an example of correcting the offset error in readings from an inclinometer by comparison with elevation readings from a barometric pressure sensor after the vehicle has undergone a sufficient change in elevation.

At 802, a road grade or incline signal, RG, may be received by the controller from the inclinometer. In one example, RG may be a reading obtained in percent in which case it may be converted to a ratio before proceeding with the calculation described herein. At 804, a vehicle speed Vs may be estimated or measured and at 806, a rate of change of elevation, RE, may be calculated as follows: RG*Vs.

At 808, the rate of change of elevation, RE, may be integrated over time to yield a total elevation change since reset, Ei. At 810, routine 800 may determine if the vehicle has undergone sufficient change in altitude. The total change in altitude, Ei, may be compared to $Threshold_K$. In one example, $Threshold_K$ may be an altitude of 2 meters, while in another example it may be 4 meters. A lack of resolution in readings from the barometric pressure sensor can be overcome by ensuring that the vehicle has undergone sufficient variation in altitude.

If it is determined that the change in altitude is lower than $Threshold_K$, at 812, routine 800 may wait to calculate the offset correction. However, if the elevation change is more than $Threshold_K$, at 814, the controller may determine a reading for elevation change, Eb, from a barometric pressure sensor onboard the vehicle. At 816, Ei and Eb may be compared and at 818, a correction factor for readings from the inclinometer may be determined as Eb/Ei. This offset correction factor may be determined such that the readings of elevation change from both, the inclinometer and the barometric pressure sensor, are equal over a significant elevation change. Thus, a reading of elevation from the inclinometer may be corrected, at 820, to provide corrected grade readings, RG_cor, as follows: RG*Eb/Ei. The correction factor may be stored in the controller's memory.

Returning now to routine 400, at 438, a change in vehicle altitude, ΔVh, may be determined as a difference between Vh_2 and Vh_1. Vh_2 may be stored in the controller's memory for the next calculation. Next, at 440, routine 400 may retrieve an average conversion factor for stored energy, SE_avg, where SE_avg is the rolling average of multiple calculations of the conversion factor during vehicle operation. Calculation of the conversion factor, SE, will be further elaborated below in reference to FIG. 5.

At 442, fuel flow rate determined at 412 may be compensated for stored vehicle energy. At 444, a compensated fuel flow rate, FFR_comp, may be estimated as follows:

$$FFR - [SE\_avg * (0.5 * \Delta Vs^2 + 32.2 * \Delta Vh)] * CK$$

where, CK is a calibration constant. In one example, CK may be set as 1 whereas in other examples, if less compensation is desired for the display of instantaneous FE readings, CK can be less than 1.

At 446, the calculated compensated fuel flow rate, FFR_comp, may be stored in the memory and a rolling average of FFR_comp may be estimated as FFR_comp_avg, based on previous calculations of FFR_comp. The rolling average calculation may be filtered to eliminate noise from measurements of vehicle speed. It will be appreciated that during most driving conditions, excluding transient conditions such as braking transmission shift events, compensated fuel flow rate, FFR_comp, may have less variation than a measured instantaneous fuel flow out of the engine.

At 448, the adjusted instantaneous FE reading may be calculated in miles per gallon units as follows:

$Vs\_2/(FFR\_comp\_avg)$

In this way, by using a conversion factor, a measured fuel economy reading may be compensated for stored vehicle energy resulting from changes in kinetic and potential energy. For example, without compensation, the instantaneous FE reading for a vehicle that is decelerating may be displayed as an infinite value. The artificial increase in FE as the vehicle slows down may be due to a deceleration fuel shut off (DFSO) condition wherein fuel flow to the engine may be cut. However, the vehicle may continue to travel due to stored vehicle energy. In this example, the conversion factor may effectively add to the existing fuel flow rate making it a positive number and thus, may adjust the instantaneous FE reading to a number lower than an infinite value.

In another example, if the vehicle is ascending an incline or accelerating in speed, an uncompensated fuel economy reading may be less than the actual fuel economy reading. Additional fuel consumed when a vehicle is ascending an incline or undergoing acceleration may be going to or due to the accumulation of energy. In the example of a vehicle that is accelerating, surplus fuel consumed by the engine, as compared to steady state fuel consumption, may be due to the addition of kinetic energy. Therefore, to compensate the existing fuel flow rate and correct the instantaneous fuel economy reading, the conversion factor may subtract an equivalent amount of fuel from the existing fuel flow.

Turning now to FIG. 5, it shows routine 500 for calculating a conversion factor, SE, for stored vehicle energy. The conversion factor is learned when certain conditions are met, specifically, when a vehicle undergoes sufficient increase in one or more of vehicle speed and vehicle altitude including a corresponding positive change in kinetic or potential energy. The conversion factor is based on fuel flow due to stored energy which is the difference between a measured fuel flow rate and a fuel flow at steady state driving conditions. A higher fuel economy reading is normally observed when the vehicle is driven at steady state conditions. In one example, fuel economy readings lower than steady state fuel economy readings may be observed when a vehicle is ascending an incline or undergoing acceleration. Lower fuel economy readings, in this example, may be attributed to fuel flow due to the addition of potential energy or kinetic energy.

At 502, routine 500 may confirm that the engine is warmed up. For example, fuel consumption may be higher at an engine cold-start which may affect calculations based on fuel flow. Therefore, if it is confirmed that the engine is not warmed up, at 514, routine 500 may wait for the engine to warm up before estimating the conversion factor.

At 504, it may be determined if the existing vehicle speed, Vs_2, is higher than a minimum threshold, $Threshold_{min}$ wherein $Threshold_{min}$, is greater than zero. In one example, $Threshold_{min}$ may be 10 miles per hour (mph) whereas in another example, $Threshold_{min}$ may be 20 mph. At speeds lower than $Threshold_{min}$, fuel consumed by the engine may be utilized to overcome rolling friction. Therefore, if it is determined that Vs_2 is lower than $Threshold_{min}$, at 514, routine 500 may wait to estimate the conversion factor.

However, if it is determined that the vehicle is moving at a speed higher than $Threshold_{min}$, routine 500 may proceed to 506 where it may assess if braking conditions exist. During braking conditions, fuel flow may be used to overcome braking friction and stored energy may be lost as heat. Therefore, any calculations to determine fuel flow rate due stored energy may encounter errors when fuel flow is used to overcome friction. If it is determined that braking conditions exist, routine 500 proceeds to 514 where it may wait to estimate the conversion factor. In one example, the conversion factor may be determined during non-braking conditions.

If braking conditions do not exist, routine 500 may proceed to 508 where it may determine if the vehicle is undergoing transmission shift events. For example, transmission shift events may produce rapid changes in engine speed that can impact fuel flow and the accuracy of vehicle speed measurements. If it is determined that a transmission shift is in progress, routine 500 may wait at 514 to determine the conversion factor.

On the other hand, if a transmission shift is not in progress, routine 500 may proceed to 510 where it may be determined if the vehicle is accelerating and if the change in square of vehicle speed, $\Delta Vs^2$, is higher than a vehicle speed threshold, $Threshold_V$. Since the conversion factor for stored energy is based on a difference between an existing fuel flow rate and fuel flow rate at steady state driving conditions, large changes in stored energy during high fuel flow conditions make the estimate of the conversion factor more robust to small errors in the fuel flow rate at steady state. If the vehicle is accelerating and the positive change in $Vs^2$ is higher than the vehicle speed threshold, the vehicle may be combusting a larger amount of fuel and adding to its stored energy. Since a change in kinetic energy is directly proportional to the square of vehicle speed, a small change in vehicle speed at higher speeds can create a larger change in kinetic energy. Therefore, the conversion factor may be learned at higher vehicle speeds and not at lower speeds.

If it is determined that the vehicle speed is not increasing and $\Delta Vs^2$ is less than $Threshold_V$, at 512, routine 500 may determine if the vehicle is ascending, e.g. climbing up an incline, and if the resulting change in vehicle altitude is higher than vehicle altitude threshold, $Threshold_h$. As explained above, the conversion factor may be determined with fewer errors if the vehicle is adding energy by either accelerating or ascending an incline. Thus, if it is determined that the vehicle is not climbing an incline and its change in altitude is not greater than $Threshold_h$, routine 500 may proceed to 514 and wait for entry conditions to be met.

If it is determined at 510 that the vehicle speed is increasing and the change in $\Delta Vs^2$ is positive and higher than $Threshold_V$, routine 500 may proceed to 516. Similarly, if it is determined that the vehicle is ascending an incline and the change in vehicle altitude is positive and higher than $Threshold_h$, routine 500 may proceed to 516 where the average steady state fuel economy reading may be retrieved from memory. Thus, the conversion factor for fuel due to stored vehicle energy may be estimated only when the vehicle undergoes a sufficient change in one or both of square of vehicle speed and vehicle altitude. If either the change in vehicle altitude or the change in square of vehicle speed is sufficient and higher than their respective thresholds, the conversion factor for stored energy may be determined.

As will be elaborated in reference to FIG. 6, the average steady state fuel economy reading, MPG_SS_avg, may be determined when the vehicle is traveling under steady state conditions without significant changes in vehicle acceleration or vehicle altitude. A steady state fuel economy reading may be estimated every time entry conditions are met and the reading may be added to previous calculations to come up with a rolling average reading, MPG_SS_avg.

At 518, a portion of fuel flow due to stored vehicle energy, FF_str, may be determined as follows:

$$FFR-(Vs\_2/MPG\_SS\_avg)$$

where, FFR is the existing fuel flow rate,

VS_2 is the existing vehicle speed, and

VS_2/MPG_SS_avg is the fuel flow at steady state driving conditions.

As discussed earlier, the effect of errors in the calculation of MPG_SS_avg may be reduced if the existing fuel flow rate, FFR, is higher. Hence, the conversion factor for stored vehicle energy may be better determined when the vehicle is experiencing a positive change in vehicle speed, e.g. accelerating, and the change in the square of vehicle speed is higher than a vehicle speed threshold, e.g. Threshold$_v$. The effect of errors in MPG_SS_avg may also be lower if the conversion factor is calculated when the vehicle is ascending an incline wherein the change in vehicle altitude is positive, and the positive change is higher than a vehicle altitude threshold such as Threshold$_h$.

In another example, if the vehicle undergoes deceleration or descends an incline, the fuel flow may be slowed down or cut off whereby the existing fuel flow is reduced. The effect of errors in the calculation of MPG_SS_avg at steady state conditions, and therefore, the fuel flow at steady state conditions, may be larger when the existing fuel flow is smaller. Thus, the calculation of the conversion factor may be more sensitive to errors in the estimation of MPG_SS_avg, and its corresponding steady state fuel flow, when the existing fuel flow is reduced.

Next, at 520, the conversion factor for fuel due to stored energy, SE, may be determined as follows:

$$FF\_str/(0.5*\Delta Vs^2+32.2*\Delta Vh)$$

where, $\Delta Vs^2$ is the change in square of vehicle speed and $\Delta Vh$ is the change in vehicle altitude in time $\Delta t$.

Thus, the conversion factor for stored energy is directly proportional to fuel flow due to stored energy and is inversely proportional to each of a change in square of vehicle speed and change in vehicle altitude. By using fuel flow due to stored energy for determining the conversion factor, the conversion factor is based on steady state fuel economy reading, MPG_SS and its average. The conversion factor can, therefore, be determined by comparing the quantity of additional fuel being consumed when kinetic and/or potential energy is added to the vehicle system with the quantity of fuel that is consumed during steady state driving conditions.

At 522, the calculated SE reading may be stored in the memory of the vehicle controller and a rolling average, SE_avg, may be calculated to learn a more accurate conversion factor.

In this way, a conversion factor for stored vehicle energy may be calculated when specific entry conditions are met, particularly when a sufficient increase in vehicle altitude is experienced and/or when a sufficient increase in square of vehicle speed occurs. The conversion factor may not be determined during transmission shifts and also may not be determined during vehicle braking conditions. The conversion factor is based solely on fuel flow rate, change in vehicle speed and change in vehicle altitude. Fuel energy content, engine efficiency and vehicle mass may be learned together as part of the conversion factor. Thus, additional knowledge of vehicle mass, energy of fuel or engine efficiency may not be required and calculations for vehicle mass and engine efficiency, or a priori knowledge of fuel energy may not be needed for estimating the conversion factor, allowing for a simpler calculation.

It will be appreciated that in the description above the conversion factor is determined when the vehicle is adding to its stored energy, e.g. when accelerating or ascending an incline. A conversion factor may be estimated when the vehicle is descending an incline and/or decelerating based on the drop in fuel flow. However, this calculation may be prone to errors from the calculation of steady state flow rate.

Turning now to FIG. 6, it depicts routine 600 for estimating a steady state fuel economy reading based on multiple entry conditions being met. Specifically, fuel economy readings may be calculated when the vehicle is traveling under steady state conditions wherein changes in each of a square of vehicle speed and vehicle altitude are below respective thresholds. Further, steady state conditions may include conditions when fuel flow, and its combustion in the engine, is used to maintain vehicle speed and not used for engine warm-up, compensating for friction, etc. Thus, routine 600 may be initiated only when various entry conditions are satisfied.

At 602, routine 600 may confirm that the engine is warmed up. In one example, fuel may be consumed to warm up the engine and thus, may not be fully utilized for maintaining vehicle speed. If it is determined that the engine is not warmed up, at 614, the steady state fuel economy reading, MPG_SS, may not be estimated and routine 600 may wait for another opportunity.

At 604, it may be determined if the existing vehicle speed, Vs_2, is higher than a minimum threshold, Threshold$_{min}$, but lower than a maximum threshold, Threshold$_{max}$. In one example, Threshold$_{min}$ may be 30 miles per hour (mph). Alternatively, Threshold$_{min}$ may be a speed of 35 mph. If the vehicle is traveling at lower speeds, for example, those at or below Threshold$_{min}$, the vehicle may encounter rolling friction and therefore, estimated fuel economy may be lower. Further, fuel economy measurements may be prone to error because the torque converter may be unlocked at lower speeds. Additionally, fuel measurements at lower speeds may also be sensitive to small loads from the air conditioning system and other electrical loads. On the other hand, if the vehicle is travelling at higher speeds, e.g. above Threshold$_{max}$, fuel economy may be lower due to air resistance. In one example, Threshold$_{max}$ may be 50 mph whereas in another example Threshold$_{max}$ may be 45 mph. Therefore, if it is determined that the vehicle is traveling at speeds below Threshold$_{min}$ or that it is traveling at speeds higher than Threshold$_{max}$, at 614, routine 600 may not estimate MPG_SS and wait for conditions to be met.

On the other hand, if it is determined that vehicle speed is between Threshold$_{min}$ and Threshold$_{max}$, at 606, it may be confirmed if braking conditions exist. Since braking events do not provide steady state conditions, fuel economy readings at such events may not represent steady state fuel economy. Therefore, if a braking event is in progress, routine 600 may proceed to 614 and may not estimate MPG_SS. If, however, it is determined that a braking event is not occurring, routine 600 may proceed to 608 where it may determine if a transmission shift is in progress. As mentioned earlier in reference to FIG. 5, transmission shift events can affect the accuracy of vehicle speed measurements and fuel flow measurements. If a transmission shift is occurring, routine 600 may be disabled at 614 and MPG_SS may not be estimated.

If a transmission shift is not occurring, routine 600 may then confirm at 610 that a change in square of vehicle speed, $\Delta Vs^2$, is lower than a threshold, $Threshold_S$. In one example, if the vehicle is traveling in cruise-control, the change in vehicle speed, or square of vehicle speed, may be zero. A significant increase or decrease in vehicle speed may produce considerable variation in fuel economy, thereby resulting in errors in the calculation of MPG_SS. If it is determined that $\Delta Vs^2$ is higher than $Threshold_S$, routine 600 may disable the calculation of steady state fuel economy at 614.

However, if $\Delta Vs^2$ is lower than or equal to $Threshold_S$, routine 600 may then confirm at 612 that the change in vehicle altitude, $\Delta Vh$, is below a threshold, $Threshold_E$. If the vehicle is climbing or descending an incline, steady state conditions may not be met. Therefore, if $\Delta Vh$ is higher than $Threshold_E$, routine 600 may not calculate MPG_SS and wait for an opportunity when all entry conditions are met. Thus, if one or both of a change in square of vehicle speed and a change in vehicle altitude are higher than their respective thresholds, steady state fuel economy readings may not be estimated. Steady state entry conditions may be met when both, the change in square of vehicle speed and change in vehicle altitude, are lower than their respective thresholds.

Returning to 612, if it is determined that $\Delta Vh$ is lower than $Threshold_E$, routine 600 may continue to 616 where MPG_SS may be calculated as:

$$Vs\_2/FFR$$

where, Vs_2 is the current or existing vehicle speed and FFR is the current fuel flow rate at steady state conditions.

At 618, the calculated MPG_SS is stored in the vehicle controller's memory and a rolling average, MPG_SS_avg, may be computed as ROLAV(MPG_SS). The rolling average may be used in calculations of compensated fuel economy or mileage.

Turning now to FIG. 7, it demonstrates an example relationship between fuel economy in miles per gallon (MPG) and steady state speed in miles per hour (MPH). Specifically, map 700 shows fuel economy in MPG plotted along the y-axis and steady state speed in MPH along the y-axis. Plot 702 shows that MPG remains relatively stable within a range of speeds depicted by lines 711 and 713. Prior to line 711, at steady state speeds lower than 30 MPH, the MPG increases rapidly from 10 MPG to ~30 MPG. Between lines 711 and 713, e.g. between steady state speeds 30 to 50 MPH, fuel economy may be the highest observed and may remain between 30 and 35 MPG. As steady state speed increases beyond 50 MPH (line 713), fuel economy reduces from ~32 MPG to 20 MPG.

To the left of line 711, at speeds between 10 MPH to 30 MPH, a larger amount of fuel may be used to counteract rolling friction. To the right of line 713, as vehicle speed increases past 50 MPH, the vehicle may encounter sufficient air resistance such that fuel consumed by the engine may be used towards overcoming the air resistance. However, at moderate speeds, e.g. between 30 MPH and 50 MPH, fuel economy remains relatively stable because the torque converter remains locked and parasitic loads, such as those from the air conditioner or other electrical loads, may not contribute to the quantity of consumed fuel. Therefore, the steady state fuel economy reading, MPG_SS, may be determined when the vehicle is traveling at moderate speeds without considerable acceleration/deceleration or changes in elevation.

Minor improvements in learning the stored energy conversion factor can be made by increasing the accuracy of MPG_SS. A more accurate fuel economy or mileage may be learned by fitting a curve of steady state fuel flow against vehicle speed, Vs. In this way, a wider range of speeds is available for learning MPG_SS.

Thus, steady state vehicle driving conditions may be used to learn a steady state fuel economy reading. If the vehicle is undergoing significant increases in either the square of vehicle speed or vehicle altitude, a conversion factor for stored energy may be determined based on the increase in fuel flow from a steady state fuel flow. This conversion factor may then be used to adjust fuel economy readings for stored energy.

The conversion factor and the steady state fuel economy readings may each be determined every time entry conditions are met. The vehicle controller may add these readings to its memory and compute rolling averages based on existing data. As the number of estimated conversion factor readings increases, a more accurate conversion factor may be determined allowing for more reliable compensation of fuel economy readings for stored energy.

Figure 9:
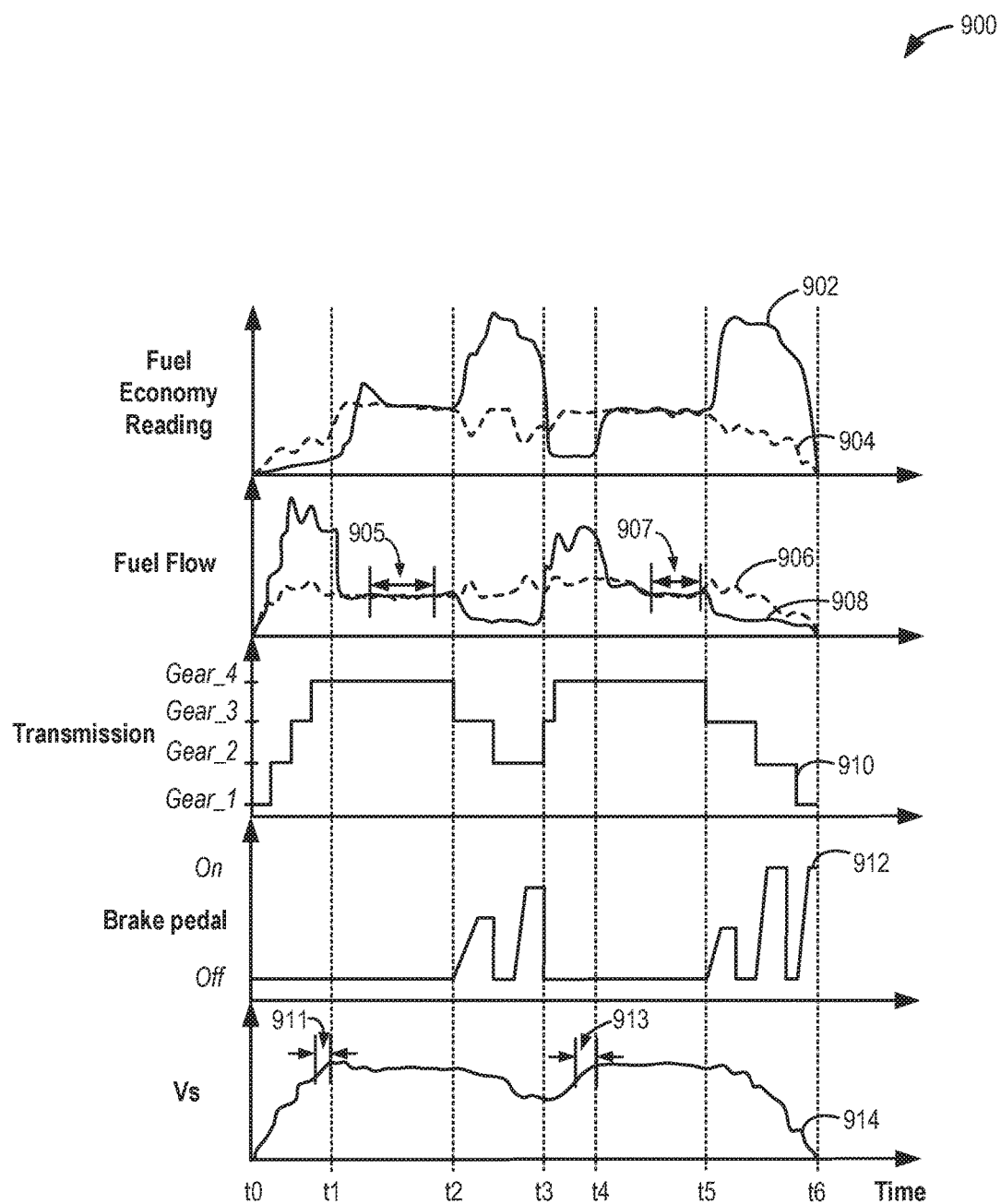
FIG. 9 shows an example vehicle operation depicting driving conditions when the conversion factor for stored energy and steady state fuel economy readings may be obtained.

Turning now to FIG. 9, it shows map 900 depicting example vehicle driving conditions when a conversion factor for stored vehicle energy, specifically, kinetic energy, may be calculated. The example in map 900 depicts a vehicle undergoing changes in kinetic energy alone. Changes in vehicle altitude, and, therefore, potential energy are nominal, and not incorporated in the example shown. Map 900 includes a calculated fuel economy at 902, a calculated fuel economy that has been adjusted for stored vehicle energy at 904, an actual fuel flow at 908, a compensated fuel flow (FFR_comp) at 906, a transmission gear state at 910, brake pedal position at 912, and vehicle speed, Vs, at 914. All the above are plotted against time on the X-axis.

Between t0 and t1, a vehicle may start moving from rest and accelerate progressively until t1. Therefore, between t0 and t1, the brake pedal may be in a released (or "off") position and as the vehicle speed increases, a vehicle controller may gradually upshift the transmission from a lower gear (such as a transmission first gear (Gear_1)) to a higher gear (such as a transmission second gear (Gear_2), to a transmission third gear (Gear_3), and then to a transmission fourth gear (Gear_4)). Thus, as the vehicle accelerates between t0 and t1, the actual fuel flow (plot 908) as measured by a fuel pulse counter rises rapidly indicating a larger amount of fuel consumption. Herein, a portion of fuel consumed by the vehicle may be going towards adding kinetic energy. Therefore, compensated fuel flow, as shown by plot 906, rises to a lower level than actual fuel flow, based on the calculation at 444 in FIG. 4. A conversion factor for stored energy in the vehicle controller's memory may be retrieved to calculate a compensated fuel flow. Thus, between t0 and t1, the uncompensated fuel economy reading (plot 902) may be lower than the fuel economy reading adjusted for stored kinetic energy (plot 904). Herein, an uncompensated fuel economy reading incorrectly shows a lower fuel economy reading based on a higher fuel flow, and the compensated fuel economy reading shows a more accurate higher fuel economy reading based on a fuel flow adjusted for fuel flow due to stored kinetic energy. Fluctuations in actual fuel flow and compensated fuel flow plots, such as the peaks between t0 and t1, may occur during transmission shifts and braking events.

As the transmission gear is upshifted to the fourth gear (Gear_4) and no further transmission shift events occur, a conversion factor for stored energy may be calculated at 911. In the duration specified by 911, the vehicle continues to accelerate and add kinetic energy to the system. Further, other entry conditions to calculate the conversion factor are also met, e.g., vehicle speed is above a minimum speed to overcome rolling friction, and the brake pedal is released.

At t1, the vehicle reaches a steady speed, and between t1 and t2, vehicle speed remains at a steady level without any changes in transmission gear setting and/or brake pedal position. Further, each of compensated fuel flow and uncompensated (actual) fuel flow reach a steady flow wherein fuel consumed by the engine is largely used for maintaining vehicle speed. Herein, entry conditions for determining the steady state fuel economy, such as steady state driving conditions, absence of transmission shift events, braking events, etc., are met. Therefore, at 905, a steady state fuel economy may be calculated as MPG_SS.

At t2, the brake pedal may be applied by an operator of the vehicle. Between t2 and t3, the brake pedal may be applied and released two times, as shown by plot 912. Due to brake application, the vehicle speed may decrease and the controller may gradually downshift the transmission from a higher gear (such as a transmission fourth gear (Gear_4)) to a lower gear (such as a transmission third gear (Gear_3), and then to a transmission second gear (Gear_2)).

Due to vehicle deceleration, the actual, uncompensated fuel flow (plot 908) to the engine decreases between t2 and t3. In response to the decrease in actual fuel flow, uncompensated fuel economy (plot 902) readings increase to higher levels, e.g. close to an infinite value. However, compensated fuel flow (plot 906) remains at the same level as between t1 and t2. Minor fluctuations in compensated fuel flow may correspond to brake applications. During deceleration, the square of vehicle speed may reduce, resulting in a negative $\Delta Vs^2$. Therefore, based on the calculation described in FIG. 4 at 444, compensated fuel flow (FFR_comp) is higher than actual fuel flow. Thus, between t2 and t3, adjusted fuel economy readings adjusted are lower than uncompensated fuel economy readings. Further, with every application of the brake pedal, a corresponding drop in adjusted fuel economy readings is observed. However, as the brake pedal is released, adjusted fuel economy readings return to levels between t1 and t2.

At t3, the brake pedal is released and vehicle speed increases to its prior steady state value existing between t1 and t2. The controller may gradually upshift the transmission from a lower gear (such as transmission second gear (gear 2)) to a higher gear (such as transmission third gear (gear3), and then to a transmission fourth gear (gear 4)).

Between t3 and t4, actual fuel flow rises as the vehicle accelerates but compensated fuel flow remains relatively steady except for peaks corresponding to transmission shifts. Consequently, uncompensated fuel economy readings decrease between t3 and t4 while fuel economy readings adjusted for stored energy remain relatively stable and higher than uncompensated fuel economy readings.

At 913, once the transmission gear is at the fourth gear and vehicle acceleration is sufficient to add energy to the vehicle system, the controller may calculate a conversion factor for stored energy. This conversion factor may be added to previous calculations and a rolling average may be calculated and stored in the controller's memory.

At t4, vehicle speed achieves a steady speed and remains at this steady speed between t4 and t5. In response to the steady state driving conditions, at 907, more calculations of fuel economy at steady state (MPG_SS) may be obtained and stored in the vehicle controller's memory. As such, between t4 and t5, transmission shift events and braking events do not occur. Further, the vehicle may be at steady state driving conditions wherein a change in square of vehicle speed may be below a threshold.

At t5, the brake pedal may be applied multiple times with a resulting decrease in vehicle speed. Further, the controller may gradually downshift the transmission from a higher gear (such as a transmission fourth gear (Gear_4)) to a lower gear (such as a transmission third gear (Gear_3), to a transmission second gear (Gear_2), and then to a transmission first gear (Gear_1)). Between t5 and t6, as the vehicle decelerates, actual fuel flow reduces whereas compensated fuel flow remains higher than actual fuel flow. Between t5 and t6, the uncompensated fuel economy readings may rise to large numbers as fuel flow reduces. However, the adjusted fuel economy readings may be lower than uncompensated fuel economy readings. Eventually the transmission may be shifted to neutral and the vehicle may be shutdown at t6. Vehicle shutdown includes a key-off condition with the engine in a shutdown condition. Thus, fuel flow, actual and compensated, declines to zero fuel flow at t6 as the vehicle (and engine) is shut down.

It will be appreciated that while the above example does not include changes in vehicle altitude, the conversion factor may be determined every time sufficient potential energy is added to the vehicle system and other entry conditions are met.

In this way, a conversion factor for stored vehicle energy may be determined based on fuel flow due to stored energy. Fuel flow due to stored energy may be obtained by subtracting fuel flow at steady state driving conditions from an existing fuel flow rate. As the existing fuel flow rate increases, e.g. during acceleration or while ascending an incline, excess fuel flow over the steady state fuel flow may be attributed to energy being added to the vehicle system. The conversion factor may be further determined based on changes in vehicle altitude, and changes in square of vehicle speed, each of which may be estimated from sensor signals and/or simple calculations. Therefore, fuel economy readings may be compensated for stored energy using a simple conversion factor without knowledge of fuel energy, vehicle mass or engine efficiency, each of which can change with time and/or across vehicles.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for vehicle operation with an engine, comprising:
sensing fuel flow and vehicle speed;
determining a fuel economy at steady-state driving conditions based on fuel flow and vehicle speed;
sensing a brake pedal position;
during non-braking conditions, estimating a conversion factor for stored vehicle energy based on the fuel economy at steady-state driving conditions;
waiting to estimate the conversion factor during braking conditions; and
displaying a fuel economy reading to an operator of a vehicle based on fuel consumed by the engine adjusted for stored vehicle energy with the conversion factor.

2. The method of claim 1, wherein steady-state driving conditions include conditions when changes in each of a square of vehicle speed and vehicle altitude are below their respective thresholds, the conversion factor based on sensor signals.

3. The method of claim 2, wherein the conversion factor for stored vehicle energy is determined when the square of vehicle speed is increased greater than a first vehicle speed threshold and vehicle altitude is increased greater than a second altitude threshold.

4. The method of claim 2, wherein the conversion factor for stored vehicle energy is directly proportional to fuel flow due to stored vehicle energy and inversely proportional to each of a change in the square of vehicle speed and a change in vehicle altitude, the change in vehicle altitude measured by an inclinometer and corrected for offset error.

5. The method of claim 4, wherein the fuel flow due to stored vehicle energy is determined by subtracting a fuel flow rate based on the fuel economy at steady-state driving conditions from an existing fuel flow rate.

6. The method of claim 1, wherein the conversion factor for stored vehicle energy and the fuel economy at steady-state driving conditions are determined after engine warm up.

7. The method of claim 1, wherein the conversion factor for stored vehicle energy and the fuel economy at steady-state driving conditions are not determined during transmission shifts.

8. The method of claim 1, wherein the conversion factor for stored vehicle energy and the fuel economy at steady-state driving conditions are not determined during vehicle braking conditions.

9. A system in a vehicle comprising:
an engine; and
a controller configured with computer readable instructions stored in non-transitory memory to:
during a first braking mode,
determine a fuel economy reading; and
waiting to estimate a conversion factor for stored vehicle energy;
during a second non-braking mode,
determine the conversion factor for stored vehicle energy based on the fuel economy reading determined in the first braking mode; and
display instantaneous fuel economy readings, which are compensated for stored vehicle energy by using the conversion factor, to an operator of the vehicle.

10. The system of claim 9, wherein the first braking mode includes steady-state driving conditions, and wherein the second non-braking mode includes only conditions when an increase in a square of vehicle speed is higher than a vehicle speed threshold and/or when an increase in vehicle altitude is higher than a vehicle altitude threshold.

* * * * *